Nov. 11, 1930.  K. E. PEILER  1,781,340
FEEDING MOLTEN GLASS
Filed Nov. 3, 1924  2 Sheets-Sheet 2
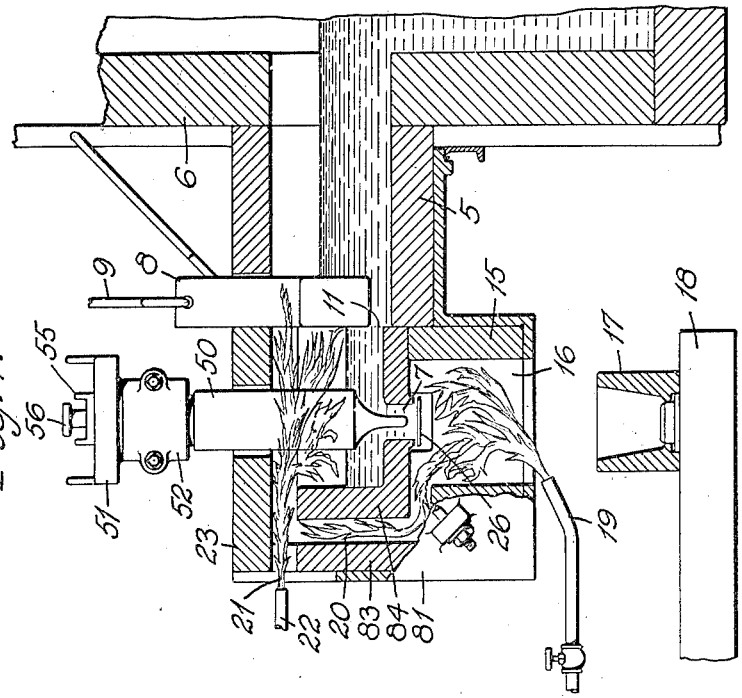
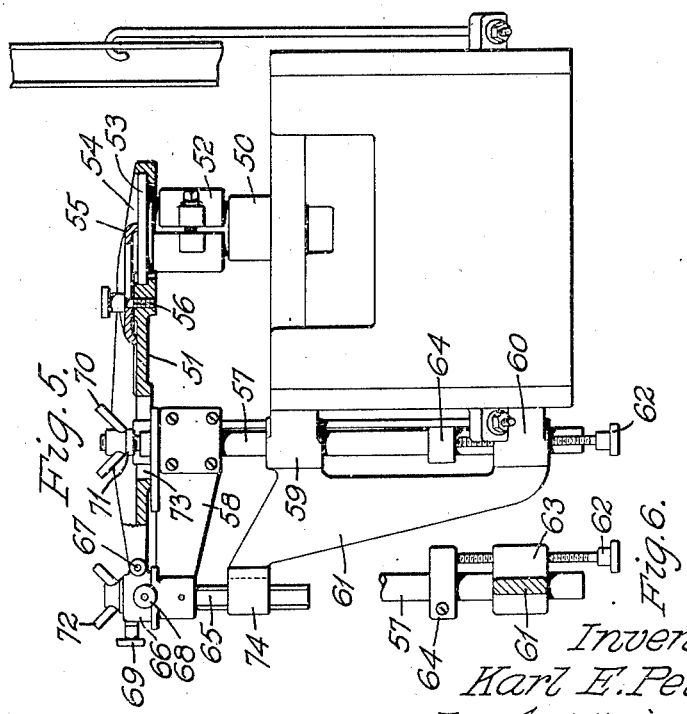
Inventor:
Karl E. Peiler
by W. H. Honiss
Atty.
Witness:
J. S. Grotta Patented Nov. 11, 1930

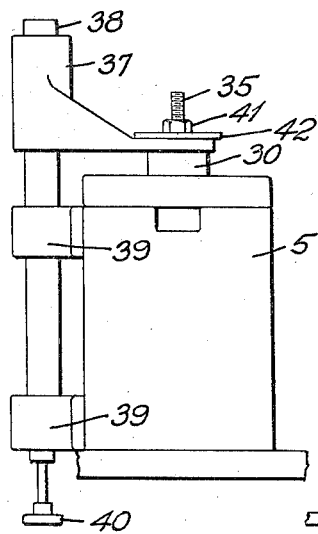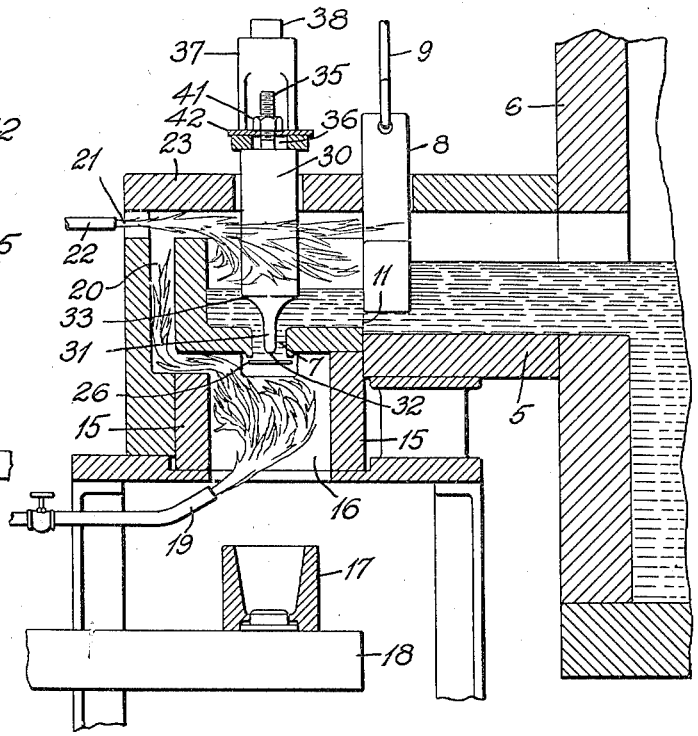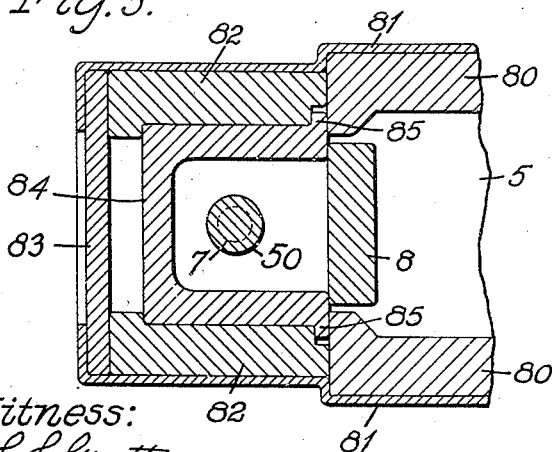

1,781,340

UNITED STATES PATENT OFFICE

KARL E. PEILER, OF WEST HARTFORD, CONNECTICUT, ASSIGNOR TO HARTFORD-EMPIRE COMPANY, OF HARTFORD, CONNECTICUT, A CORPORATION OF DELAWARE

FEEDING MOLTEN GLASS

Application filed November 3, 1924. Serial No. 747,503.

This invention relates to the art of feeding molten glass and separating it into compact and homogeneous mold charges suitable for blowing, pressing or other glass-shaping purposes.

One object of my invention is to provide a method and an apparatus for feeding molten glass wherein the glass is caused to issue through a downwardly opening discharge outlet and is provided with internal support by means of a stationary implement around which the glass flows while it is issuing from the outlet. The adhesion of the glass to this implement furnishes support to the issuing glass in addition to the support afforded by the walls of the outlet, and the provision of such additional support permits larger and longer mold charges to be severed in suspension and at slower speeds than would be possible without the internal support.

Another object of my invention is to provide a method and an apparatus for feeding molten glass in which the rate of discharge throughout the cross-section of the discharge orifice is substantially equalized by means of the implement referred to above, thereby facilitating the production of mold charges of substantially cylindrical form.

A further object of my invention is to provide a method and an apparatus for feeding molten glass in which a comparatively low head of glass may be maintained above the discharge outlet.

This invention contemplates the use of a container for the molten glass, such for example, as a forehearth connected to a melting tank furnace, the container having a discharge outlet through which the glass is permitted to flow downward by gravity, unmodified by any periodic impulse means such as are frequently used in glass-feeding operations. The glass preferably issues from the discharge outlet into a heated chamber, or the lower end of the outlet is otherwise heated, and such external heat causes the glass in the outlet to be kept hot, thereby preventing the glass from chilling adjacent to the walls of the outlet. This tends to produce a uniform discharge throughout the entire cross-sectional area of the outlet, and permits the formation of substantially cylindrical mold charges which are severed periodically by means of suitable shears.

The structure described in the preceding paragraph is shown in my co-pending application for Letters Patent, Serial No. 823,694, filed March 10, 1914. The present invention adds to the structure of that co-pending application a stationary supporting and regulating member in the nature of a needle, the end of which is considerably smaller in diameter than the discharge outlet and projects into or through the discharge outlet. This added structure is disclosed in my copending prior applications, Serial No. 294,792 and Serial No. 294,793, both filed May 5, 1919, of which this application, therefore, is a continuation in part. The needle is not intended to be reciprocated periodically, but is preferably provided with adjustments for changing its vertical position, and also for changing its lateral position with respect to the outlet.

In the accompanying drawings,

Figure 1 is a longitudinal vertical sectional view taken through a working embodiment of the invention;

Fig. 2 is a front elevational view of the structure shown in Fig. 1;

Fig. 3 is a horizontal sectional view showing a suitable construction of the discharge chamber;

Fig. 4 is a longitudinal vertical sectional view similar to Fig. 1, but showing another structure for supporting and adjusting the needle;

Fig. 5 is a front elevational view of the structure shown in Fig. 4;

Fig. 6 is a fragmentary front view of a portion of the needle-adjusting mechanism shown in Fig. 5; and Fig. 7 is a plan view of the needle supporting and adjusting device shown in Figs. 4, 5 and 6.

In Figs. 1 and 2 of the drawing, the numeral 6 indicates a glass melting tank furnace from which the glass flows along a conduit or forehearth 5 provided with a downwardly opening discharge outlet 7 and with suitable temperature-controlling means which may be of any suitable arrangement, according to approved glass-feeder practice, and may include heating flames, cooling blasts, and heat-retaining insulation, as desired. The conduit may be arranged so that the glass flows by gravity as herein shown, or its flow may be accelerated, intermitted or otherwise regulated by suitable paddles, displacers, or otherwise. I find, however, that simple gravity flow from the tank 6 to the discharge outlet 7 is entirely sufficient for ordinary operation, and such gravity flow may be regulated by means of a movable gate 8 suspended by a cable 9 and adjustable vertically by means of any suitable arrangement. The gate may hang freely from the cable 9, as shown, or if desired, off-set ledges or rabbets may be provided, as shown at 11 in dotted lines on Fig. 1, and as described below in connection with Fig. 3, for preventing the gate 8 from being carried toward the outlet 7 by the flowing glass.

The space below the outlet 7 is preferably surrounded by walls 15 to form a heat-enclosing chamber 16. The bottom of the chamber 16 is open sufficiently to allow the several charges of glass to fall freely into a suitable receptacle, which is herein shown as a mold 17 mounted upon a table or platform 18 which may be the work table of a pressing or blowing machine.

The chamber 16 is made large enough to allow the drops or gathers of glass to form beneath the outlet 7 to the required size without touching the walls of the chamber, thus leaving room for a gaseous envelope to surround the pendant glass. The heat of the molten glass may be relied upon to maintain the chamber 16 at an elevated temperature, but I prefer to supplement the heat derived passively from the glass by active heat produced by suitable burners or other means. For example, a burner nozzle 19 is shown in Fig. 1, and this nozzle is preferably so disposed as to blow the flame along the inner sides of the walls 15 of the chamber 16, so as to surround the suspended charges of glass with a hot flame which may pass out from the chamber 16 through a flue 20 to the space above the glass in the conduit 5.

If the tank furnace 6 is of the continuous type fired with natural gas or with cleaned coal gas of sufficiently high fuel value, it may be operated with a very low positive outward pressure or a neutral pressure in the firing space of the nose or working end of the furnace, or it may, under other conditions, even be operated with a negative pressure in this firing space. Under these conditions, the flame and combustion gases from the forehearth 5 may be drawn or blown inwardly to the interior of the firing space in the nose of the tank 6, and will thence pass to the furnace stack with the other furnace gases. If, however, the tank furnace 6 is fired with crude producer gas under certain conditions, or is so proportioned as to prevent the draught adjustments necessary for operating under neutral or negative pressure, a positive pressure or "sting-out" condition might exist in the firing space of the nose, against which flames and gases from the forehearth could not be blown to the interior of the firing space. In this instance, the flames and gases from the forehearth may be led through a suitable opening in the top 23 of the conduit 5, or to a forehearth chimney, if such a chimney is provided. If, instead of a continuous melting furnace, a day tank is employed, then the working condition in the firing space may readily be regulated to produce the desired result independently of the glass-melting conditions, since the melting takes place when the glass is not being fed or worked.

The side walls 15 of the chamber 16 are suitably apertured for the entrance of severing means, which, as shown herein, consist of oppositely moving shear blades 26, which may be constructed and operated as shown in my prior application, Serial No. 823,694, mentioned above, or in any other well-known or desired manner. These shear blades may be cooled by means of water sprays, air blasts, or otherwise, in order to prevent them from becoming overheated.

Supported above and in line with the discharge outlet 7 is a member 30, herein referred to as a supporting needle. The lower end 31 of this needle is reduced in diameter and the tip 32 may be pointed, or otherwise shaped, as desired. The enlargement or shoulder 33 between the end portion 31 and the body of the needle may be suitably shaped to cooperate with the upper edge of the outlet 7 so that the member 30 may be lowered to seat in the outlet and stop the flow of glass when it is desired to shut down the apparatus. The lower end of the needle 30, and particularly the enlarged portion just mentioned, may also be used, if desired, to act as a throttle and to control by its position the discharge of glass from the orifice under the head existing in the container.

The needle 30 is kept stationary during the operation of the apparatus, but is preferably adjustably supported as follows: First, its support is guided for vertical movement with a relatively delicate adjustment so that the vertical position of the implement may be adjusted as desired. Second, the support or holder for the implement is adapted to be adjusted horizontally, preferably in two directions substantially at right angles to each other, so that the axis of the implement may be moved with respect to the axis of the outlet for the purpose of either aligning the point of the implement centrally with the orifice 7, or else displacing its position out of central alignment to compensate for unsymmetrical discharge conditions in the orifice.

These adjustments may be provided in a variety of ways. Figs. 1 and 2 show an example of one simple way in which this may be done. The member 30 is suspended by means of a screw-threaded hanger 35 extending through a slot 36 in an arm 37, which in turn is carried at the upper end of a vertical rod 38 mounted in bearings 39. The rod 38 is arranged to slide vertically in the bearings 39 and its vertical position may be adjusted by means of a hand wheel 40.

The arm 37 may be swung around the rod 38 to produce lateral adjustment of the needle in a lengthwise direction. For adjusting the arm 37 laterally, the hanger 35 is movable in the slot 36, and is fixed in adjusted position therein by means of a nut 41 and a washer 42.

Another arrangement for adjusting the needle both vertically and horizontally is shown in Figs. 4 to 7, and provides a more accurate and convenient adjustment than the arrangement of Figs. 1 and 2, which has just been described. In Figs. 4 to 7 the needle, indicated at 50, is carried by an arm 51 and the connection between the needle and the arm is such that the needle may be easily removed without disturbing the adjustment of the arm. For this purpose, the upper end of the needle is clamped in a removable chuck 52 having at its upper end a circular plate 53 which is received and supported in an opening 54 in the end of the arm 51 and is held down on its seat by a clamp 55 pressed upon the plate 53 by a hand screw 56. The clamp 55 is slotted to receive the screw 56, so that when the screw is loosened the clamp may be slid back from over the top of the plate 53, thereby permitting the needle 50 to be removed.

The arm 51 is guided for vertical adjustment by a sliding rod 57, the arm 51 being adjustably clamped to a bracket 58 fixed to the upper end of the rod. This construction permits adjusting the arm 51 laterally in any direction to bring the lower end of the needle 50 to any desired position with relation to the outlet 7 by sliding the arm 51 on its bracket 58 or swinging it on the rod 57, or by a combination of these adjustments. The rod 57 is received and guided in vertically spaced bearings 59 and 60 carried by a bracket 61, and the vertical adjustment of the rod is produced by means of a hand screw 62 which extends through a screw-threaded opening in a projection 63 extending laterally from the lower bearing 60. The upper end of the hand screw 62 supports the needle structure by engaging beneath a collar 64 that is secured adjustably to the rod 57, as best shown in Fig. 6.

For producing lateral adjustment of the needle the bracket 58 carries a post 65 which projects vertically above and below the bracket 58 and is embraced loosely at its upper end by a square collar 66, to which the outer end of the arm 51 is attached by means of a hinge pin 67. The collar 66 and the parts connected therewith may be adjusted laterally with relation to the bracket 58 by means of hand screws 68 and 69, which are threaded into the post 59 at right angles to each other. By turning the screw 69, the collar 66 and the arm 51 may be adjusted longitudinally, and by turning the screw 68, the arm may be adjusted transversely by a swinging movement around the upper end of the rod 57.

The arm 51 may be clamped in position after adjustment by means of a wing nut 70 threaded upon the top of the rod 57, and bearing on a clamp 71, and also by means of a wing nut 72 on the top of the post 65. The rod 57 passes through a slot 73 in the arm 51, and when the nut 70 is loosened to permit adjustment of the position of the needle 50, the arm 51 may slide upon or pivot around the upper end of the rod 57. In order that the arm 51 may be swung upwardly on the hinge pin 67 without removing the nut 70 or the clamp 71, the nut 70 is made of such size that it will pass through the slot 73, and the clamp 71 beneath the nut 70 is of such proportions that when the clamp is turned transversely of the arm, the ends of the clamp rest on the arm, but when the nut 70 is loosened, the clamp may be turned lengthwise of the arm, which permits the arm to be lifted without removing the nut or the clamp from the rod 57.

In order to prevent the rod 57 from turning and thereby displacing the needle, the lower end of the post 65 projects downwardly and is engaged in a bearing 74, carried by the bracket 61. The post 65 may be provided with graduations, if desired, which by their relation to the top of the bearing 74 indicate the vertical position of the needle 50 with respect to the outlet 7. These graduations are preferably arranged to indicate zero when the end of the needle is in the plane of the lower end of the outlet 7, and to read above and below zero.

Further details as to the needle adjustment which has just been described are shown in my United States Patent No. 1,760,254, granted May 27, 1930, it being understood that the similar adjustments shown in that patent are employed with a periodically reciprocating implement, while in the present case the needle does not reciprocate periodically but is merely adjustable, and remains stationary during the feeding operation.

Figs. 3 and 4 of the drawing show a forehearth construction which I have found to be well adapted for use in this glass feeder. As there shown, the refractory walls 80 of the conduit 5 are enclosed in a metal jacket 81 which also surrounds a discharge chamber consisting of side blocks 82, an end block 83 and a hollow spout block 84 which has flanges 85 fitting within suitable recesses in the blocks 82. The gate 8 rests against the side walls of the spout block 84, and is thereby prevented from being displaced toward the discharge outlet 7 by the pressure of the flowing glass. It will, of course, be understood that my invention is not restricted to this particular forehearth construction.

In the operation of the apparatus described above, the proportions of the outlet 7 and of the lower end of the stationary needle are so selected that the glass will issue from the outlet in a column of the desired diameter. The needle is adjusted vertically and horizontally so as to permit the glass to flow through the outlet uniformly and at the desired rate, and the gate 8 is then raised sufficiently to permit a suitable flow of the glass under the gate and into the discharge chamber. The glass in the furnace 6 should either be maintained at a heat sufficient to produce the desired viscous condition of the glass or else the forehearth temperature should be controlled for this purpose.

As the glass issues from the outlet 7, it is supported externally by the walls of the outlet 7 and internally by the surface of the needle-end 31, and the rate of flow through the outlet 7 is thereby reduced and equalized, producing a uniform cylindrical discharge, this result being assisted by the heated condition of the outlet as indicated above. The glass accumulates in a compact cylindrical mass beneath the outlet 7 in the heated chamber 16, and the possible size of this mass before it tends to break into stream form is materially increased by the supporting effect of the needle end 31. When the desired quantity of freely suspended glass has accumulated and elongated in this manner, a mold charge is cut off by the inward stroke of the shear blades 26 and the mold charge falls into the mold or other receptacle 17.

The stationary needle has several important functions: First, it furnishes support to the interior of the issuing glass and to the glass which is depending below the outlet, and this additional support, as indicated above, permits the severing, in freely hanging suspension, of larger and longer mold charges than can be produced by simple gravity flow without such additional support. Second, the presence of the needle tends to equalize the rate of discharge throughout the cross-section of the discharge outlet, so that it is easier to obtain mold charges of substantially cylindrical form. This production of cylindrical mold charges is also aided by the presence of heat outside of the orifice. Third, the needle permits the operation of the feeding apparatus with a lower head of glass above the outlet than would otherwise be possible, because if the needle is omitted and the head of glass in the container is too low in proportion to the size of the outlet, air will be drawn into the discharging glass in a cavity formed near the center of the glass. The presence of the point of the supporting needle prevents such cavitation and drawing-in of air, and, therefore, permits operation with lower heads of glass, which greatly increases the range of the apparatus.

The shears 26 may suitably be arranged for adjustment both vertically and horizontally, as shown, for example, in my United States Patent No. 1,655,391, granted Jan. 3, 1928. The vertical adjustment permits severing at varying distances from the outlet, thus producing mold charges of different sizes, and the horizontal adjustment permits alignment of the shears with the outlet and compensation for any tendency of the shears to throw the severed mold charge sidewise.

If desired, the shears may be given a dropping movement during and immediately after the shear cut, thus giving the various advantages and results obtained by dropping shears, as set forth, for example, in the U. S. patent to Ferngren No. 1,362,785.

The use of such dropping shears also permits operation of the present system without the use of a heated chamber, or other means, for externally heating the discharge orifice. If the shears are reciprocated horizontally without the dropping movement just referred to, and if the outlet is not externally heated, the shears tend to chill the glass at the point of severance. In addition, the shears and particularly the upper shear blade have a folding or puckering action upon the chilled skin that forms upon the glass as soon as it emerges into the air. This action tends to smear the glass at the discharge orifice, and such smearing of chilled glass will soon interfere with proper feeding. If, on the other hand, the shears are given a dropping movement in connection with the severing operation, the contact between the shears and the glass is reduced to a minimum and chilled glass is not pushed or smeared across the outlet. Therefore, the glass is permitted to issue continuously from the outlet without the puckering and smearing effects mentioned above.

It will be observed that this invention provides a glass feeder which is extremely simple in construction and has few moving elements. I have found that cylindrical mold charges may be delivered in this manner having a length at least three times their diameter, such mold charges being very uniform in viscosity, and with a minimum cold skin or enamel on their surfaces. If cylindrical charges materially longer than three diameters are desired, the charge as delivered by the apparatus described above may be elongated, either by passing through a suitable delivery trough of proper size or by passing through a guiding and shaping funnel.

I am aware that it has been proposed to control the flow of glass from a discharge opening by means of a regulating plug arranged adjustably at or above such an opening. Regulating plugs of this nature have heretofore been used in connection with devices of the stream-feeding type, in which the glass issues from the outlet in a continuous stream which coils and folds in the mold or other receptacle, and the regulating plug performs merely the function of a throttle to determine the quantity of glass which is discharged, and to stop the flow by seating in the discharge opening when it is desired to stop the feeding operation. The use of a stationary regulator in a glass outlet for aiding in supporting the glass in the production of freely-hanging mold charges is believed to be new with the present invention, and also the use of such a regulator in combination with an externally-heated discharge outlet, or with descending shears, as set forth herein.

Numerous changes in the construction and arrangement of parts may be made without departing from my invention, the scope of which is indicated in the appended claims.

I claim as my invention:

1. The method of forming molten glass into mold charges, which comprises discharging molten glass through an outlet, suspending the issuing glass from the outlet in a mass additionally suspending the issuing glass at the axis of said mass without imparting motion thereto, and severing a mold charge from the suspended mass before it receives any substantial undersupport.

2. The method of forming molten glass into mold charges, which comprises discharging molten glass through an outlet, suspending the issuing glass from the outlet in a mass additionally suspending the issuing glass at the axis of said mass without imparting motion thereto, permitting the suspended mass to elongate, and severing a mold charge from the said mass before it receives any substantial undersupport.

3. The method of forming and separating mold charges of molten glass, which comprises discharging successive masses of the glass through an outlet, suspending each of said masses from the outlet additionally suspending each of said masses at its axis without imparting motion thereto, and severing a mold charge from each of said suspended masses.

4. The method of feeding molten glass, which comprises causing glass to flow by gravity through a downwardly-opening and externally-heated discharge outlet, suspending a portion of the issuing glass at its axis in said outlet without imparting motion thereto, and severing mold charges from the glass suspended below said outlet before it receives any substantial undersupport.

5. The method of feeding molten glass in a succession of substantially cylindrical mold charges, which comprises the step of causing glass to flow by gravity through a downwardly-opening and externally-heated discharge outlet, suspending the issuing glass both from the outlet and at its axis in the outlet without imparting motion thereto and without preventing flow of glass through the outlet, thereby supporting both the exterior and the interior of the issuing glass and increasing the length to which the glass will issue in cylindrical form without substantial attenuation, and thereby also equalizing the rate of flow of the glass throughout said outlet.

6. The method of separating molten glass into mold charges, which comprises flowing the glass through a submerged outlet supporting the issued glass at its axis from above without imparting motion thereto, and severing mold charges from the issued glass.

7. The method of separating molten glass into mold charges, which comprises flowing the glass downwardly through an outlet, periodically accumulating the issuing glass in solid masses below the outlet, suspending each of said masses both at its axis and from the outlet without imparting motion thereto severing a mold charge from each of said masses, and moving the severing means while severing in the direction of movement of the glass at the severing point.

8. The method of feeding molten glass, which comprises causing glass to flow by gravity through a downwardly-opening and externally-heated discharge outlet supporting from above the issued glass below the outlet both at its axis and from the outlet without imparting motion thereto, and severing mold charges from the glass suspended below said outlet.

9. The method of feeding molten glass, which comprises causing glass to flow by gravity through a downwardly-opening discharge outlet supporting the issued glass from above both at its axis and from the outlet without imparting motion thereto, severing mold charges from the glass suspended below said outlet, and causing the severing means to descend after the severing operation.

10. The method of feeding molten glass, which comprises causing glass to flow by gravity through a downwardly-opening discharge outlet suspending the issuing glass at its axis in the outlet and from the outlet without imparting motion thereto and without preventing flow of glass through the outlet, severing mold charges from the glass suspended below said outlet, and causing the severing means to descend during and after the severing operation.

11. In apparatus for separating molten glass into mold charges, the combination, with a container for the glass having a discharge outlet below the surface level of the glass, of shear blades adapted to meet beneath the outlet to sever masses of the glass suspended therebeneath, and a stationary implement having its lower end portion terminating in a centrally disposed projection of relatively small cross sectional area depending in the outlet without completely obstructing the outlet, for aiding in supporting successive suspended masses of glass beneath said outlet.

12. Apparatus for separating molten glass into mold charges, including a container for the glass having a discharge outlet, a stationary implement having its lower end portion reduced in size to form an extension of relatively small cross sectional area, said extension projecting downwardly from the implement into said outlet in spaced relation to the walls of said outlet, for supporting, guiding and accumulating in suspended masses the glass discharged from said outlet, and shears beneath the said outlet for severing mold charges from the suspended masses.

13. Apparatus for separating molten glass into mold charges, comprising a container for the glass having a submerged outlet, a vertically and laterally adjustable normally stationary implement having a lower end portion reduced in size to form an extension of relatively small cross sectional area, said extension projecting into said outlet out of contact with the walls of the outlet, and shears for severing mold charges from the glass below said outlet.

14. Apparatus for separating molten glass into mold charges, including a container for the glass having a discharge outlet, a stationary member having a lower end portion of relatively small cross sectional area, said lower portion projecting downwardly into said outlet and out of contact with the walls of said outlet for supporting, guiding and accumulating in suspended masses the glass discharged from said outlet, means for adjusting the said member vertically and laterally with respect to said outlet, and shears beneath said outlet for severing mold charges from the suspended masses of glass.

15. The combination with a container for molten glass having a discharge outlet, of means for separating the glass into mold charges, comprising a heating chamber surrounding the said outlet and the glass discharged therefrom, a stationary implement having at its lower end a shoulder portion adjacent to the bottom walls of said container and terminating in a long narrow projection extending into said outlet but out of contact with the walls thereof, and severing means adapted to sever mold charges from the glass discharged from said outlet.

16. Apparatus for segregating molten glass and separating it into mold charges, comprising a container for the glass having a downwardly-opening discharge outlet, a rigid stationary implement having a lower end portion of relatively small cross sectional area, said implement having its lower end projecting into said outlet and out of contact therewith, and means for severing mold charges from the glass discharged from said outlet.

17. Apparatus for feeding molten glass comprising a container for the glass having a downwardly opening discharge outlet, means for externally heating said outlet, a stationary vertical flow-regulating member having a shoulder portion adjacent to the bottom wall of the container and above the outlet, the lower extremity of said shoulder portion terminating in a relatively long narrow projection extending into said outlet in spaced relation to the walls of the outlet, means for adjusting the vertical position of said member, and means for severing mold charges from the glass below the outlet.

18. Apparatus for feeding molten glass comprising a container for the glass having a downwardly-opening discharge outlet, means for externally heating said outlet, a normally stationary vertical flow-regulating member having a lower end of relatively small cross-sectional area adjustably positioned in said outlet and having, above said lower end, an enlarged portion adapted to throttle said outlet and to seat in said outlet on downward movement of the throttling member to stop the flow of the glass therethrough, and means for severing mold charges from the glass below said outlet.

Signed at Hartford, Conn., this 30th day of October, 1924.

KARL E. PEILER.